United States Patent [19]

Nguyen

[11] Patent Number: 5,014,053

[45] Date of Patent: May 7, 1991

[54] METHOD AND APPARATUS FOR DETERMINING ACTUAL LATERAL DEVIATION FROM RUNWAY CENTERLINE

[75] Inventor: Dung D. Nguyen, Edmonds, Wash.

[73] Assignee: The Boeing Company, Seattle, Wash.

[21] Appl. No.: 467,004

[22] Filed: Jan. 18, 1990

[51] Int. Cl.$^5$ .............................................. G01C 21/00
[52] U.S. Cl. .................................... 340/979; 244/184; 340/971; 342/33; 364/434
[58] Field of Search .............. 340/971, 976, 979, 967; 364/434, 447, 457, 428; 342/33-35, 439; 244/183, 184

[56] References Cited

U.S. PATENT DOCUMENTS

| | | | |
|---|---|---|---|
| 3,136,502 | 6/1964 | Auld, Jr. et al. | 244/184 |
| 3,417,945 | 12/1968 | Reynolds et al. | 244/184 |
| 3,773,281 | 11/1973 | Doniger et al. | 244/184 |
| 3,918,662 | 11/1975 | Vircks et al. | 364/429 |
| 4,697,768 | 10/1987 | Klein | 364/434 |
| 4,714,929 | 12/1987 | Davidson | 340/976 |

Primary Examiner—Joseph A. Orsino
Assistant Examiner—Brent A. Swarthout
Attorney, Agent, or Firm—Christensen, O'Connor, Johnson & Kindness

[57] ABSTRACT

A method of and apparatus for determining the actual lateral deviation from the centerline of a runway of an aircraft located outside the normal region covered by a glideslope beam is disclosed. The method comprises the steps of scaling a geometrically developed estimated lateral deviation value ($Y_{estimate}$) with a compensation factor (K) and passing the result through a complementary filter. The complementary filter produces an estimated lateral deviation rate value ($\dot{Y}_{estimate}$) that is divided into the actual lateral deviation rate value ($\dot{Y}_{actual}$) produced by the inertial navigation system of the aircraft. The result of the division is the compensation factor (K) that is used to scale the geometrically developed estimated lateral deviation value. Preferably, the compensation factor is filtered by a first order lag filter prior to being used to scale the geometrically developed estimated lateral deviation value. The output of the complementary filter is the desired actual lateral deviation value ($Y_{actual}$).

15 Claims, 2 Drawing Sheets

METHOD AND APPARATUS FOR DETERMINING ACTUAL LATERAL DEVIATION FROM RUNWAY CENTERLINE

TECHNICAL AREA

This invention is directed to aircraft control systems and, more particularly, the autolanding portion of aircraft control systems.

BACKGROUND OF THE INVENTION

The baseline localizer control law of an aircraft autolanding control system utilizes lateral deviation and lateral deviation rate values as primary feedbacks to determine, and then control, the position of the aircraft relative to a runway. Lateral deviation values are based on the angle of the localizer beam produced by the localizer transmitter and the estimated distance to the runway threshold, which is a function of the glideslope beam error and radio altitude. Contemporary glideslope beams have a coverage angle of 0.75° and the contemporary radio altimeter range of a glideslope beam is 2,500 feet. Frequently, aircraft "capture" the localizer beam well outside of these glideslope ranges. Out-of-range localizer beam capture often leads to an underestimate of the distance to the runway threshold and, thus, an erroneous estimate of the actual lateral deviation of the aircraft. Errors of up to fifty percent (50%), 20 miles from the runway threshold, can occur. Incorrect lateral deviation estimation can lead to poor localizer beam capture performance, including localizer standoffs and loose tracking of the runway centerline.

One obvious way of improving lateral deviation estimation is to increase the range of the Instrument Landing System (ILS) and Radio Altimeter (LRRA) beam, i.e., increase the range of the glideslope beam. Unfortunately, this solution involves upgrading all ground station ILS transmitters and all airplane radio altimeters. Such a solution is undesirable because it is both time consuming to implement and expensive. The present invention is directed to providing an alternative way of determining the actual lateral deviation from the centerline of a runway of an aircraft located outside the region normally covered by the glideslope beam that does not require a ground station ILS transmitter and/or aircraft radio altimeter modification.

SUMMARY OF THE INVENTION

In accordance with this invention, a method of and apparatus for determining the actual lateral deviation from the centerline of a runway of an aircraft located outside the region normally covered by the glideslope beam is provided. The method generally comprises the steps of scaling a geometrically developed estimated lateral deviation value ($Y_{estimated}$) by a compensation factor (K) whose value is based on an estimated lateral deviation rate value ($\dot{Y}_{estimated}$) divided by an actual lateral deviation rate value ($\dot{Y}_{actual}$). The estimated lateral deviation rate value ($\dot{Y}_{estimated}$) is obtained by passing the compensated geometrically developed estimated lateral deviation value ($K \cdot Y_{estimated}$) through a complementary filter. The complementary filter produces the estimated lateral deviation rate value ($\dot{Y}_{estimated}$). The actual lateral deviation rate value ($\dot{Y}_{actual}$) is produced by the inertial navigation system of the aircraft.

In accordance with further aspects of this invention, the compensation factor (K) is filtered by a first order lag filter prior to being used to scale the geometrically developed estimated lateral deviation value ($Y_{estimated}$).

In accordance with still further aspects of this invention, the complementary filter is a second order complementary filter.

As will be appreciated from the foregoing brief summary, the invention makes use of the fact that the filtered deviation rate differs from the actual deviation rate by a scale factor that is the same as the scale factor error between the actual and estimated lateral deviation. Passing the scale or compensation factor through a first order lag filter having a suitable time constant, e.g., 10 seconds, provides protection against errors created by beam noise. The compensation factor becomes unity when the aircraft comes within the normal range of the glideslope beam.

BRIEF DESCRIPTION OF THE DRAWINGS

The foregoing objects and many of the attendant advantages of this invention will become more readily appreciated as the same becomes better understood by reference to the following Detailed Description when taken in conjunction with the accompanying drawings wherein.

DESCRIPTION OF THE PREFERRED EMBODIMENT

Figure 1:
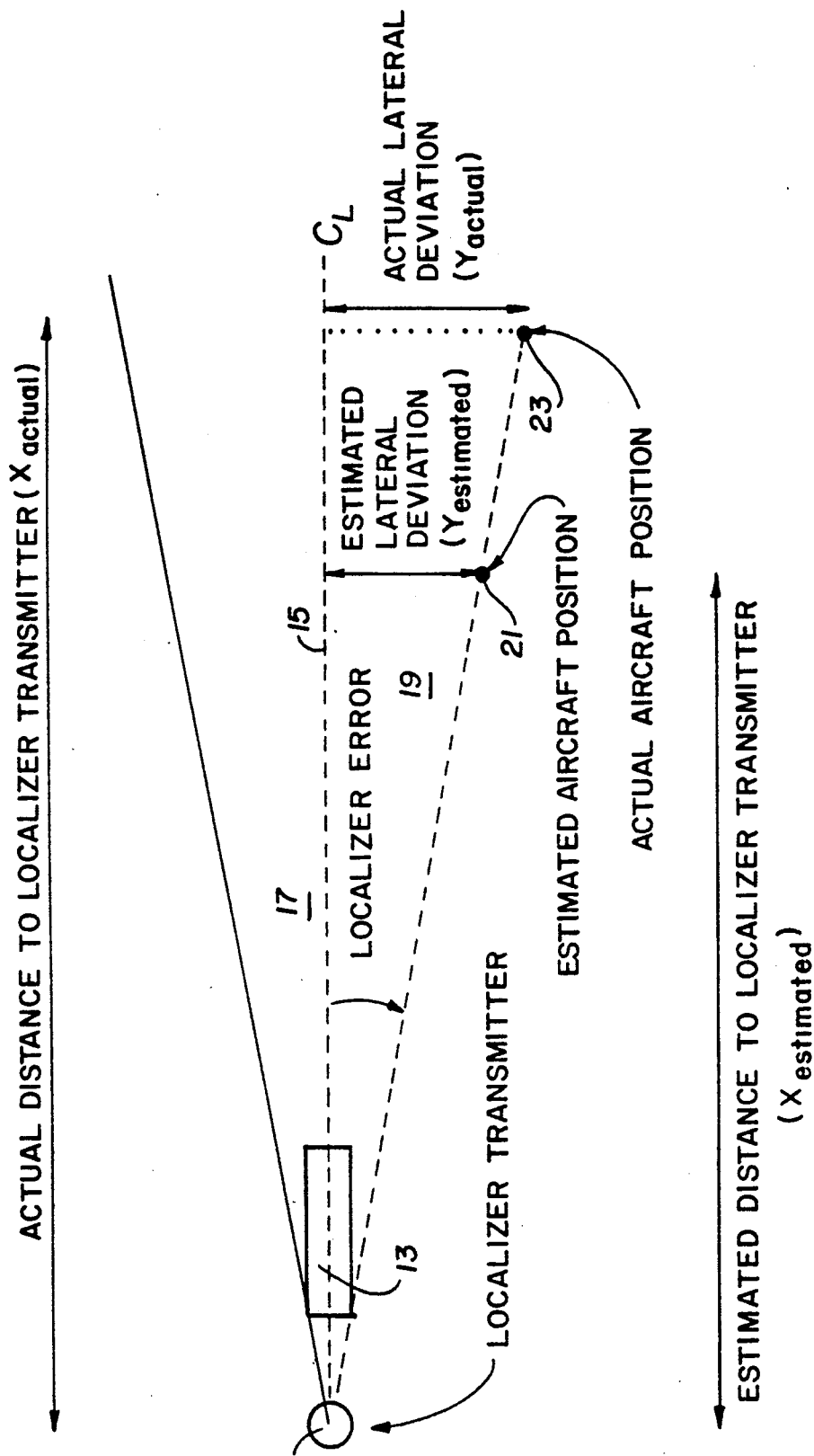
FIG. 1 is a pictorial diagram illustrating lateral deviation geometry associated with an aircraft approaching a runway outside of the normal region covered by the glideslope beam, the localizer beam angle being greatly increased for purposes of clarity.

FIG. 1 is a geometric diagram illustrating the problem solved by the present invention. More specifically, FIG. 1 illustrates a localizer transmitter 11 located at one end of a runway 13. In a conventional manner, the localizer transmitter 11 generates a localizer beam centered on the runway centerline 15. The localizer beam covers equal localizer error angles 17 and 19 on opposite sides of the centerline 15. The localizer beam error angles are greatly exaggerated in FIG. 1 for purposes of clarity. The localizer beam produced by the localizer transmitter is used by aircraft during landing, including autolandings, i.e., landings controlled by the autopilot system of an aircraft. When the localizer beam is first "captured" by an aircraft receiver, the beam is utilized to determine the position of the aircraft with respect to the landing threshold of the runway 13. Specifically, when the localizer beam is captured, the autolanding portion of the aircraft autopilot system estimates the position of the aircraft with respect to the runway threshold. Unfortunately, when the localizer beam is captured by an aircraft located outside the region normally covered by the glideslope beam, the autopilot system often produces an erroneous estimate of the position of the aircraft. Underestimate errors of up to fifty percent (50%), 20 miles from the runway threshold, can occur.

Aircraft position is determined, in part, by the autolanding portion of the autopilot system of the aircraft estimating the lateral deviation of the aircraft with respect to the centerline 15. As shown in FIG. 1, an erroneous underestimated lateral deviation value can create an estimated aircraft position 21 that is considerably closer to the runway 13 than the actual aircraft position 23. This error can produce a localizer standoff and loose tracking of the runway centerline as well as other effects. As will be better understood from the following description, the invention avoids this problem by scaling the geometrically developed estimated lateral deviation value ($Y_{estimated}$) with a compensation factor (K). The compensation factor (K) is created by dividing an estimated lateral deviation rate value ($\dot{Y}_{estimated}$) into the actual lateral deviation rate value ($\dot{Y}_{actual}$). The actual lateral deviation rate value ($\dot{Y}_{actual}$) is produced by the inertial navigation system of the aircraft. The estimated lateral deviation rate value ($\dot{Y}_{estimated}$) is produced by a complementary filter that filters the scaled geometrically developed estimated lateral deviation value.

Figure 2:
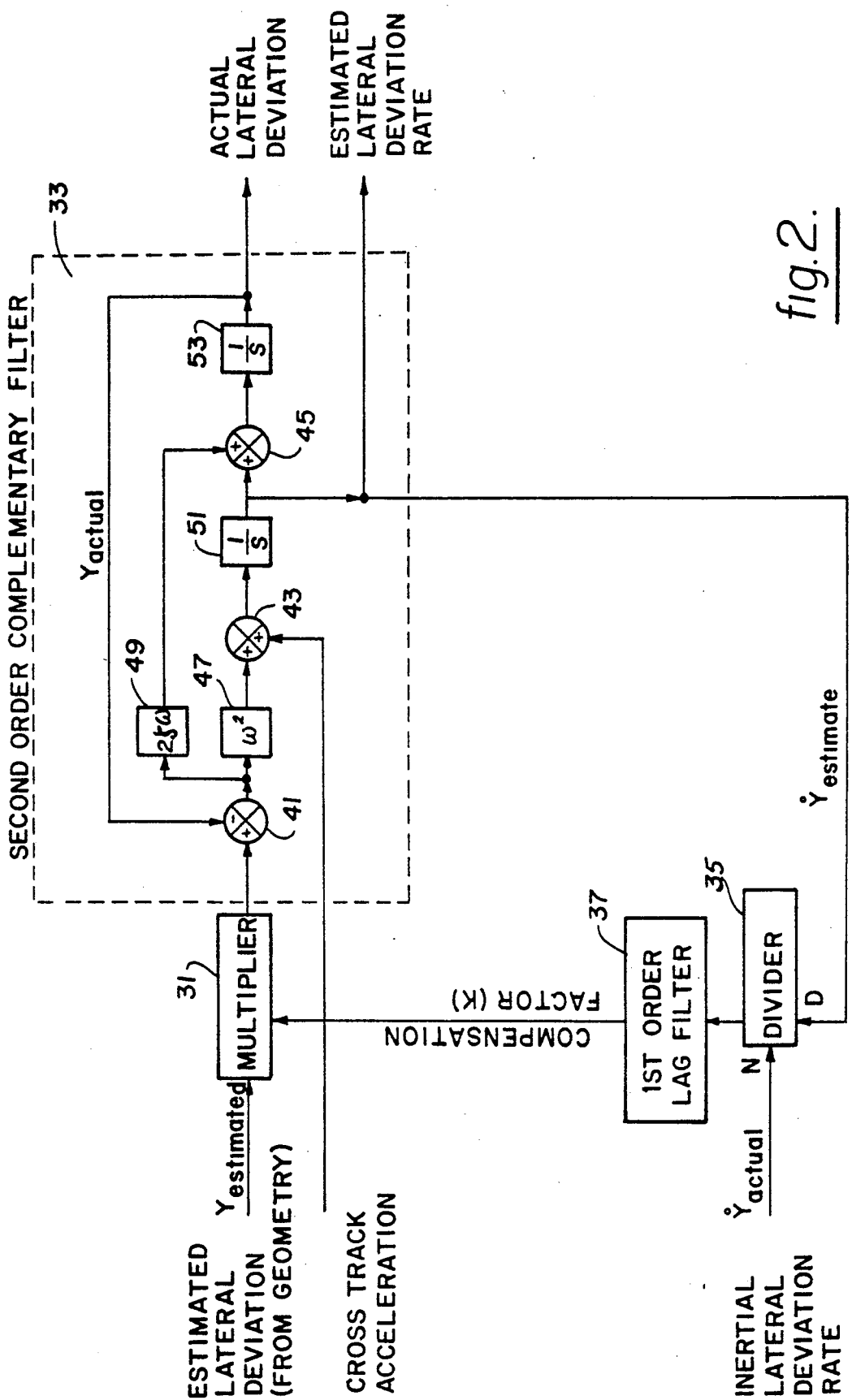
FIG. 2 is a block diagram illustrating a preferred embodiment of the invention.

FIG. 2 is a block diagram of an apparatus for carrying out the method of the invention. More specifically, FIG. 2 is a functional diagram in control system block form, illustrating a mechanism for carrying out the method of the invention, i.e., a method of determining the actual lateral deviation of an aircraft from the centerline of a runway when the aircraft is outside the region normally covered by the glideslope beam.

The embodiment of the invention illustrated in FIG. 2 includes: a multiplier 31; a second order complementary filter 33; a divider 35; and a first order lag filter 37. The second order complementary filter includes: a subtractive summer 41; two additive summers 43 and 45; an $\omega^2$ multiplier 47; a $2\zeta\omega$ multiplier 49; and first and second integrators 51 and 53. The estimated lateral deviation value ($Y_{estimate}$), determined in a conventional manner by the autolanding system of the aircraft based on geometric principles, is applied to one input of the multiplier 31. The output of the multiplier is applied to the positive (+) input of the subtractive summer 41. The output of the subtractive summer 41 is applied to the input of the $\omega^2$ multiplier 47 and to the input of the $2\zeta\omega$ multiplier 49. The output of the $\omega^2$ multiplier 47 is applied to one input of the first additive summer 43. A cross-track acceleration signal produced by the inertial navigation system of the aircraft is applied to the second input of the first additive summer 43. The output of the first additive summer is applied to the input of the first integrator 51 and the output of the first integrator 51 is applied to one input of the second additive summer 45. The output of the $2\zeta\omega$ multiplier 49 is applied to the second input of the second additive summer 45. The output of the second additive summer 45 is applied to the input of the second integrator 53. The output of the second integrator is applied to the negative (−) input of the subtractive summer 41. The output of the second integrator is the actual lateral deviation value ($Y_{actual}$).

The output of the first integrator 51, which is the estimated lateral deviation rate value ($\dot{Y}_{estimate}$), is applied to the denominator input of the divider 53. The actual lateral deviation rate value determined by the inertial navigation system of the aircraft ($\dot{Y}_{actual}$) is applied to the numerator input of the divider 35. The output of the divider 35 is applied through the first order lag filter 37 to the second input of the multiplier 31. The output of the first order lag filter 37 is the compensation factor (K).

In accordance with the invention, the value of $\omega$ is determined in accordance with the equation:

$$\omega = 2000/d \quad (1)$$

where:
d equals distance to the runway threshold in feet.

$\zeta$ is equal to 1.0 and the preferred time constant of the first order lag filter is 10 seconds.

As will be readily appreciated by those skilled in this art from viewing FIG. 2 and the foregoing description, the scaled estimated lateral deviation value (K·$Y_{estimate}$) is filtered by the second order complementary filter 33. The second order complementary filter generates an estimated lateral deviation rate value ($\dot{Y}_{estimate}$) that is divided into the actual (inertial) deviation rate value ($\dot{Y}_{actual}$) to produce the compensation factor (K) that is used to scale the estimated deviation ($Y_{estimate}$). The output of the complementary filter is the actual lateral deviation value ($Y_{actual}$). The use of a second order complementary filter, as opposed to a first order complementary filter, and the inclusion of cross-track acceleration smooths the response and removes high-frequency errors. In essence, the cross-track acceleration input smooths other inertially developed signals.

As will be apparent from viewing FIG. 1, at geometry limited locations, the estimated distance to the localizer transmitter can be defined by the following equation:

$$X_{estimated} = X_{actual}/K \quad (2)$$

where: K is greater than or equal to one.

The estimated lateral deviation can be defined by the following equation:

$$Y_{estimate} = Y_{actual}/K \quad (3)$$

Differentiating Equation (3) creates the following equation:

$$\dot{Y}_{estimate} = \dot{Y}_{actual}/K \quad (4)$$

which can be rearranged to read:

$$K = \dot{Y}_{actual}/\dot{Y}_{estimate} \quad (5)$$

Equation (5) defines the operation of the divider 35. The inertial lateral deviation rate value ($\dot{Y}_{actual}$) is easily determined by aircraft ground track angle and ground speed vis-a-vis the known location of the localizer transmitter.

As will be readily appreciated from the foregoing description, the invention provides a method of and apparatus for determining the actual lateral deviation from the centerline of a runway of an aircraft located outside the region normally covered by a glideslope beam. The invention determines the actual lateral deviation value by scaling an estimated lateral deviation value determined in a conventional manner by the autolanding system of an aircraft using geometric principles. The scaling factor is determined by dividing the actual lateral deviation rate of the aircraft by an estimated lateral deviation rate developed by passing the scaled estimated lateral deviation value through a complementary filter.

The embodiments of the invention in which an exclusive property or privilege is claimed are defined as follows:

1. A method of determining the actual lateral deviation from a runway centerline of an aircraft located outside of the region normally covered by a glideslope beam that has captured the localizer beam associated with the runway, determined the actual lateral deviation rate of the aircraft from the runway centerline and estimated the lateral deviation of the aircraft from the runway centerline, said method comprising the steps of:

scaling the estimated lateral deviation value by a compensation factor;

complementary filtering the scaled estimated lateral deviation value to produce an actual lateral deviation value and an estimated lateral deviation rate value; and dividing the actual lateral deviation rate value determined by the aircraft by the estimated lateral deviation rate value to produce the compensation factor used to scale the estimated lateral deviation value.

2. The method claimed in claim 1, wherein said compensation factor is lag filtered prior to being used to scale said estimated lateral deviation value.

3. The method claimed in claim 1, wherein said complementary filtering is second order complementary filtering.

4. The method claimed in claim 3, wherein said compensation factor is lag filtered prior to being used to scale said estimated lateral deviation value.

5. In an aircraft autolanding system that produces an estimated lateral deviation value and an actual lateral deviation rate value from a runway centerline during a landing approach, the improvement comprising an apparatus for determining the actual lateral deviation of the aircraft with respect to the centerline of a runway when the aircraft is located outside of the range normally covered by a glideslope beam associated with the runway, said apparatus comprising:

(a) scaling means for scaling said estimated lateral deviation value by a compensation factor and producing a scaled estimated lateral deviation value;

(b) complementary filter means coupled to said scaling means for receiving said scaled estimated lateral deviation value and producing:

(i) an estimated lateral deviation rate value; and (ii) an actual lateral deviation value both said estimated lateral deviation rate value and said actual lateral deviation value based on said scaled estimated lateral deviation value; and (c) divider means for receiving said estimated lateral deviation rate value and said actual lateral deviation rate value, dividing said actual lateral deviation rate value by said estimated lateral deviation rate value to produce said compensation factor and applying said compensation factor to said scaling means.

6. The improvement claimed in claim 5, including a lag filter for lag filtering said compensation factor produced by said divider means prior to applying said compensation factor to said scaling means.

7. The improvement claimed in claim 6, wherein said lag filter is a first order lag filter.

8. The improvement claimed in claim 7, wherein the time constant of said lag filter is approximately 10 seconds.

9. The improvement claimed in claim 5, wherein said complementary filter means is a second order complementary filter.

10. The improvement claimed in claim 9, including a lag filter for lag filtering said compensation factor produced by said divider means prior to applying said compensation factor to said scaling means.

11. The improvement claimed in claim 10, wherein said lag filter is a first order lag filter.

12. The improvement claimed in claim 11, wherein the time constant of said lag filter is approximately 10 seconds.

13. The improvement claimed in claim 5, wherein said scaling means comprises a multiplier for multiplying said estimated lateral deviation value by said compensation factor.

14. The improvement claimed in claim 12, including a lag filter for lag filtering said compensation factor produced by said divider means prior to applying said compensation factor to said scaling means.

15. The improvement claimed in claim 13, wherein said complementary filter means is a second order complementary filter.

* * * * *

UNITED STATES PATENT AND TRADEMARK OFFICE
CERTIFICATE OF CORRECTION

PATENT NO. : 5,014,053
DATED : May 7, 1991
INVENTOR(S) : Dung D. Nguyen It is certified that error appears in the above-identified patent and that said Letters Patent is hereby corrected as shown below:

ON THE TITLE PAGE:

| | LINE | |
|---|---|---|
| Item [57] | 10 | Delete "$Y_{estimate}$" and insert therefor --$\dot{Y}_{estimate}$-- |
| Item [57] | 11 and 12 | Delete "$Y_{ac\text{-}tual}$" and insert therefor --$\dot{Y}_{actual}$-- |
| Column 5 | 41 | Delete "value" and insert therefor --value,-- |

Signed and Sealed this

Twelfth Day of January, 1993

*Attest:*

DOUGLAS B. COMER

*Attesting Officer*    *Acting Commissioner of Patents and Trademarks*